July 27, 1965  SHIGENORI TOMIOKA  3,197,300
PROCESS OF PRODUCING A SOIL NUTRIENT BY REACTING
A HUMIC MATTER WITH NITRIC ACID
Filed Jan. 18, 1963  2 Sheets-Sheet 1
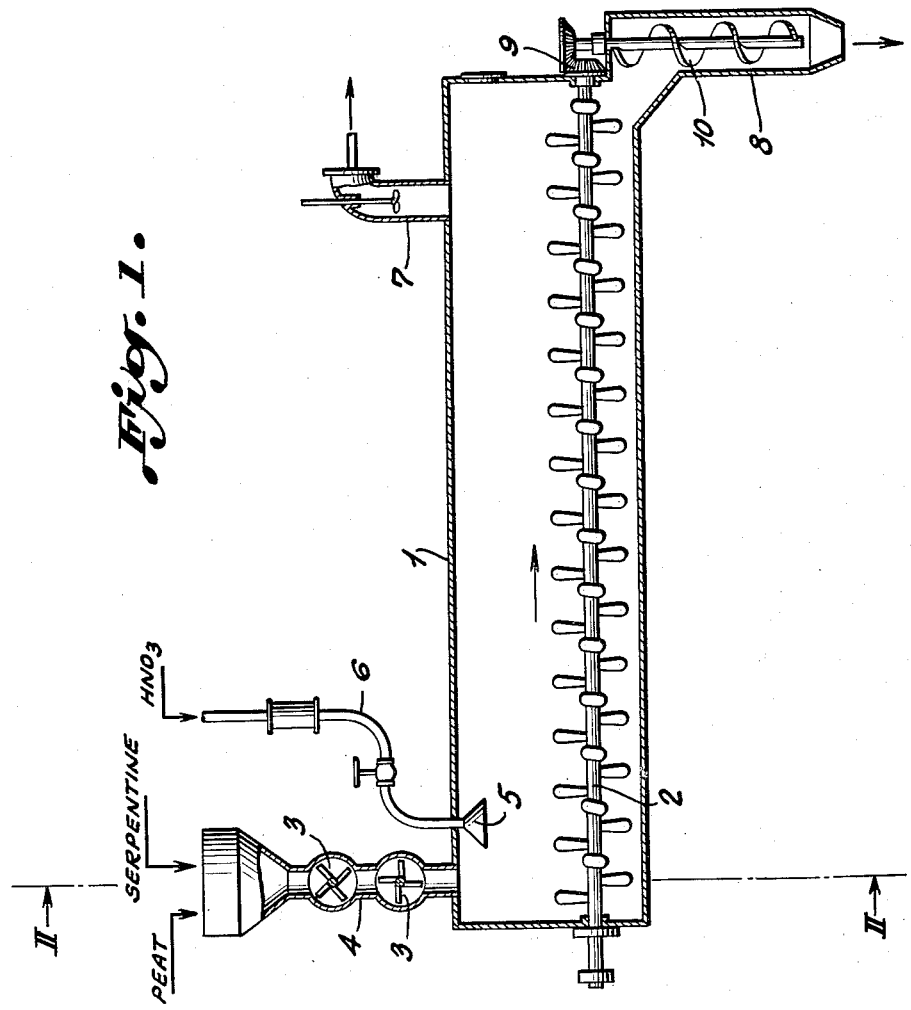
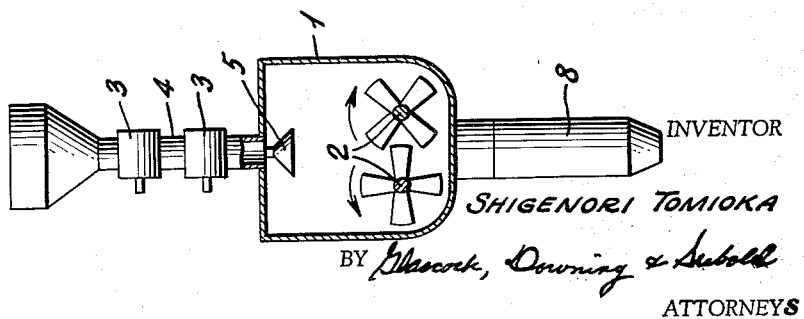
INVENTOR
SHIGENORI TOMIOKA
BY
ATTORNEYS

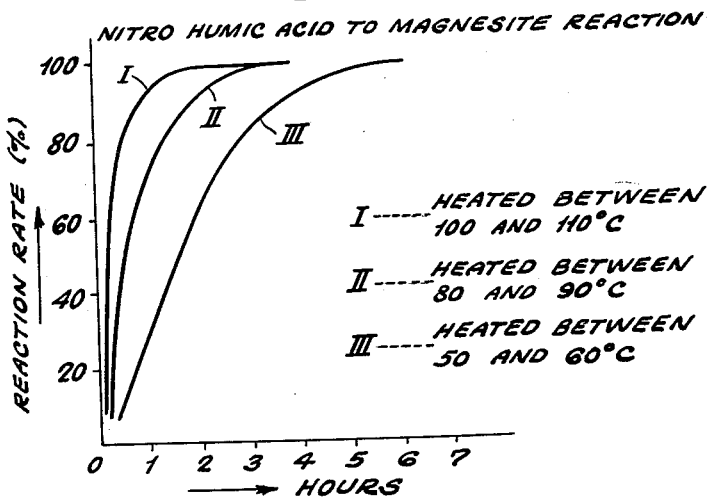
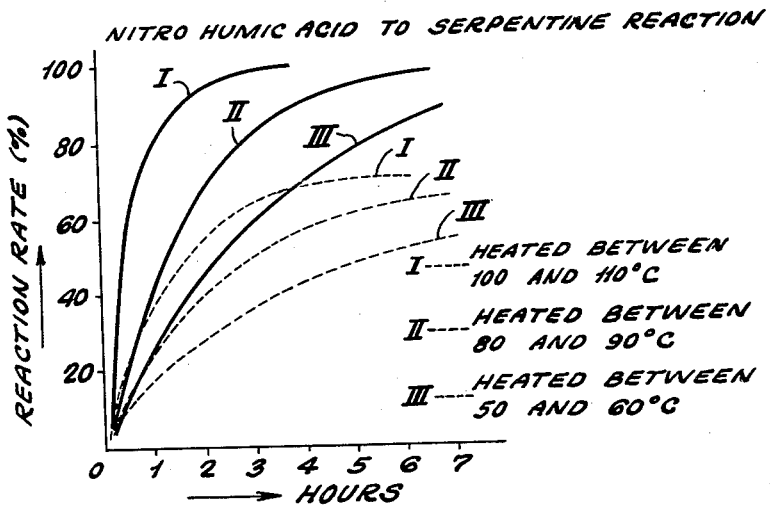
NOTE: THE FULL-LINE CURVES DENOTE CALCINED SERPENTINE OR NON-CALCINED SERPENTINE ADDED WITH ALKALI. THE DOTTED-LINE CURVES DENOTE NON-CALCINED SERPENTINE ALONE.

3,197,300
PROCESS OF PRODUCING A SOIL NUTRIENT BY REACTING A HUMIC MATTER WITH NITRIC ACID
Shigenori Tomioka, 2210, 2-chome, Sanno, Ota-ku, Tokyo, Japan
Filed Jan. 18, 1963, Ser. No. 252,466
Claims priority, application Japan, June 16, 1962, 37/25,023
3 Claims. (Cl. 71—24)

The present invention relates to an improved soil conditioning and fertilizing composition consisting primarily of humic acid magnesium salts or nitro humic acid magnesium salts, and has particular reference to the method for manufacturing the same.

Briefly stated, the present invention contemplates the employment of such organic substances (humus) as lignite, peat, turf and the like for interaction with magnesia-containing substances whereby an advanced soil conditioner or builder herein termed "humic acid magnesium salt" may be produced. Prior to reaction with magnesia or substances containing magnesia, such humic materials may have nitro radicals introduced thereinto so that a product of higher activity called "nitro humic acid magnesium salt" may be obtained.

Generally, soil conditioners or improvers must be discussed from both a chemical and a physical point of view. Chemically speaking, they are used to make up for the deficiency of plant food or humus in the soil. For example, they are widely applied to soils in areas where magnesium, silicic acid and other vital elements are inherently less available or where such elements have been gradually utilized by the cultivation of crops and vegetables over a period of time. Particularly, in the case of volcanic type soils, it is difficult to maintain phosphoric acid—one of three major nutritional elements—free from combination with other elements and hence capable of being absorbed by the growing plants. Phosphoric acid tends to combine with CaO in the soil and loses its availability to plant life.

On the other hand, the physical end of the requirements for soil conditioning and maintenance in to provide porosity, aeration, water-absorption and other biotic factors necessary for the soil to maintain the growth of living plants, and further to condition the soil so as to minimize the depletion of useful chemical ingredients. Soft soil, so to speak, is generally regarded as desirable for underground vegetables such as radishes, potatoes, etc. to grow satisfactorily. The object of improving the soil conditions can be best achieved when the requirements are filled both chemically and physically as above noted.

In general, such humic matters as lignite, peat and turf are known to permit the desired pelletization of soil particles and to impart porosity, aeration and water-absorption. However, these substances are so acidic that they can hardly be applied as they are without having detrimental effects upon plant life. Therefore, they have heretofore been used only after being neutralized to a substantial extent by treating with inorganic acids and then with basic substances, or after being treated with suitable acids to induce humic acids followed by the addition of urea or ammonia gas thereby to form humic urea or ammonia. Products known by such treatments are, for example, nitro humic acid produced by nitric acid treatment or a compound of nitro humic acid and calcium of urea, whereas humic acid salts consisting of humic acids and magnesium or nitro humic acids and magnesium are not known.

Conventional soil conditioners or builders consisting of nitro humic acid salts may be said to be prepared only with nitro humic acids for all practical purposes. In the case of nitro humic acid products containing calcium, sufficient effects as fertilizer cannot be fully achieved because of poor solubility. On the other hand, such compounds containing ammonium or sodium salts are found too easy to dissolve. It has been proposed to impregnate humic matters with alkaline solution such as of caustic soda, sodium carbonate or lime thereby to form alkali salts. This would cause the greater proportion of the humic acid of lower molecular weight to be leached away and therefore entail the necessity of employing oxidation and neutralization steps with the aid of precipitants to recover free humic acids. Furthermore, the alkali salts thereby obtained are barely soluble in water and are therefore difficult to be processed for immediate application to soils.

It is therefore an objective of the present invention to provide an improved soil conditioning compound which will eliminate the above-noted difficulties.

Another objective of the invention is to provide a high-quality soil manuring and fertilizing compound by means of adroitly engineered apparatus which permits massive production at a high rate of efficiency and with minimum cost.

In particular, the method according to the present invention consists in the reaction of magnesia-containing substances such as serpentine and magnesite with humus as lignite, peat, turf and the like, to produce humic acid magnesium salts. A chemical treatment such as nitration may be employed to introduce nitro radicals in such humic supply prior to its reaction with magnesia-containing substances, so that the resulting product is nitro humic acid magnesium. A preferred mode of the invention further comprises introducing a proper amount of silicic acid as a free component into the composition.

Experiments show that in the process of adding magnesite, dolomite, or serpentine to humic acids, the use of water about half the total weight of the solid mixture accelerates the production and serves high economy. The use of water may be accompanied by an appreciable quantity of alkali, thereby further enhancing the yield. The process of the present invention above described is carried out on a continuous basin, as will be later stated.

More particularly, the process according to the present invention utilizes humus including lignite, peat, turf and the like as a starting material to be reacted with magnesia or substances containing magnesia such as magnesium oxide, serpentine, calcined serpentine or the like, this reaction being made by heating the mixture at about 120° C. under certain pressure conditions in the presence of water and/or alkali. The process of the invention includes the step of treating the above humus or organic materials with dilute nitric acid to produce nitro humic acids which may be reacted with magniesium carbonate, magnesium hydroxide, magnesium oxide, magnesium sulfate or other magnesium salts, or matters containing some proportion of magnesia such as serpentine, dolomite, magnesite, etc. The product thereby obtained has been ascertained to have a superior effect as a soil conditioning and improving medium. It is to be noted that the process of the invention further contemplates employment of magnesium silicate as one of the said magnesia-containing substances for the reaction with humic acids wherein the silicic acid portion is preserved as free unreacted part of the resulting nitro humic acid magnesium so that it may be separated and refined to be readily used as a commercial product.

The soil improving and fertilizing compound obtained in accordance with the present invention, although the definition thereof as to its chemcial structure is somewhat complicated, may be theoretically termed "humic acid magnesium" or "nitro humic acid magnesium." The structural formula of this compound has been found very effective as a result of sampling tests, as will be later described.

At present, there are seen on the market various types of salts of nitro humic acids such as ammonium salt, sodium salt, calcium salt and urea salt. Compared with these salts the soil builder of the present invention has distinguishable advantages brought forth, by the process of manufacture in which nitro humic acid is brought into reaction with serpentine, calcined serpentine or other silicic acids, together with substances containing magnesium in macro reticular bonding therewith, so that said magnesium is combined with humic acid radicals thereby providing the product with such chemical properties as to be easily assimilated by the growing plant and such physical properties as to accelerate the ganulation of soil particles which is essential to the maintenance of porosity, aeration and water-absorption. In other words, it is necessary to release the persistent inter-bonds of humic acid particles in humus which prevent the effective action upon soil and plant. For this purpose, the humic acid particles may be disintegrated into monomers so as to become highly active. To increase this activity, according to the present invention, these acids are subjected to nitration.

The soil improving compound thus obtained excels all conventional manuring and fertilizing chemicals in that it is more readily and easily taken up by the soil and the vegetation, as well, and in that it possesses such a high dissolving power as consistent with the desired retentivity in the soil. Another merit worthy of note as characteristic of the present invention is the fact that humic acids or nitro humic acids are made to coexist with magnesium, thereby increasing the index of phosphoric acid absorption by the plants. Further characteristic of the present invention is that prior to its reation with a magnesia-containing material such as serpentine, nitro humic acid is treated to become a water-soluble salt with alkali salts of the type including Na, K, $NH_4$ and the like, so that when it is admixed with a powder of said magnesia-containing material and heated to a temperature between 20 and 120° C. to effect exchange reaction it will accelerate the precipitation of insoluble nitro humic acid-magnesium salts thus increasing the yield of the desired magnesium salts.

Let us now observe the instance where silicic acid magnesium is used as a reactant with nitro humic acid. Magnesium, being silicate in this instance, will combine with carboxyl radicals of nitro humic acid but not as easily as it would react with ions in the solution. The reaction rate plotted against time is graphed in the accompanying drawing. FIG. 4 shows by the dotted line curves I and II and yield of nitro humic acid magnesium obtained from the first series of experiments wherein 100 parts of nitro humic acid obtained by the reaction of lignite with nitric acid were admixed with 100 parts of non-calcined serpentine, the whole being heated at temperatures ranging from 80° C. to 110° C. Subsequent tests included the step of forming a water-soluble salt of nitro humic acid with the aid of salts of sodium, potassium or ammonium, followed by the suspension of fine particles of silicic acid magnesium. In this manner the two reacting components underwent an exchange reaction causing the greater proportion of insoluble nitro humic acid—silicic acid magnesium—to settle successfully.

For example, to 100 parts nitro humic acid may be added 0.4 to 1.0 part of 5% NaOH solution and 4 to 7 parts calcined or non-calcined serpentine. The mixture may be aged at normal temperature until the precipitates are separated and identified. Experimental evidence shows that the desired product is obtainable at a yield of 90%. This is illustrated by the solid line curve I and II of the graph. Such a high yield may be attributed to the fact that Na, K or $NH_4$ ions will, when brought into reaction with silicic acid magnesium, become free and readily combined with unreacted nitro humic acid, thus providing a catalytic action so that net production of the desired nitro humic acid magnesium may be greatly increased.

Used as a magnesia-containing material in the present invention other than calcined or noncalcined serpentine is chrome slug which is, however, less reactive than the above two; calcined serpentine being less reactive than noncalcined serpentine. When a reaction mixture of nitro humic acid and silicic acid magnesium is subjected to aging, the yield of the desired product increases nearly in proportion with the temperature but sharply declines at elevated temperatures in excess of 120° C. where nitro humic acid is believed to undergo decomposition.

In addition to the above noted characteristic features of the present invention, it may deserve particular note that the process of the invention exhibits industrial usefulness when applied to rather difficultly soluble magnesium-containing materials such as serpentine in that silicic acid contained in the material can be maintained free in the end product and the effectiveness of magnesium is thereby pronounced. Now, as means of supporting the effectiveness of the invented soil improver the solubility in citric acid is discussed as follows.

The solubility of non-calcined serpentine in citric acid is normally around 3.8% and reaches barely 7.2% after being calcined in its massive state. However, if it is reacted with nitro humic acid in accordance with the present invention the citric acid solubility increases as much as to 58% with accelerated magnesium activity as shown in Table 1.

TABLE 1

|  | T-MgO | C-MgO | Solubility in Citric Acid (given as percentage increase) |
| --- | --- | --- | --- |
| Non-calcined serpentine | 35.53 | 1.38 | 3.88 |
| Calcined serpentine | 40.74 | 2.94 | 7.22 |
| Invented product | 6.17 | 3.56 | 57.70 |

The above data have been ascertained to hold true with silicic acid also.

The accompanying drawing graphically illustrates the change of reactivity with operating temperatures and reaction time with respect to the case of nitro humic acid with magnesite, non-calcined serpentine and calcined serpentined. FIG. 3 depicts the case where 90 parts nitro humic acid obtained by reacting lignite with nitric acid was admixed with 5 to 15 parts magnesite. FIG. 4 shows the case where 80 parts nitro humic acid was admixed with 15 to 25 parts non-calcined or calcined serpentine, and further added with 30 to 100% of water, the whole being heated at 100 to 110° C., 80 to 90° C., and 50 to 60° C., respectively. The curves I, II and III respectively show the corresponding yields of nitro humic acid magnesium, suggesting the possibility of a theoretical 100% yield. Even with non-calcined serpentine, the reactivity was found to average 60 or 70%.

Essential to the success of reaction of nitro humic acid with magnesium is the presence of water in an amount of 30 to 100% of the mass. The use of water less than the range of quantities just stated results in poor yields due to early evaporation of moisture content and hence insufficient reaction. Conversely, excessive water entails undue loss of heat. As already mentioned, the critical upper limit of reaction temperatures should be considered in the neighborhood of 120° C. for all practical purposes consistent with economy and efficiency.

The present invention will be described below in connection with the continuous mode of its operation.

A great many literatures and technical reports have been introduced concerning the process of manufacturing nitro humic acid soil improving compounds. Most of them, however, deal exclusively with the batch type processes and typically contemplate employment of rather mild temperatures for the reaction of humus with nitric acid, these temperatures being controlled by heating or cooling the composition using a relatively dilute nitric acid. High care is required to maintain the critical temperature conditions necessitating sometimes the rapid cooling of the mixture to remove excessive reaction heat. In such instances, it is quite difficult to maintain a smooth reaction because the mixture is apt to boil over in the absence of proper care. Furthermore, in producing salts of nitro humic acid it has hitherto been required to filter and wash nitro humic acid to remove reaction waste liquor and to neutralize the precipitates suspended in water with alkali. Therefore, the industry has been seeking for a practical technique of continuously producing nitro humic acid or its salts in large quantities and at low cost.

To meet this requirement, the present invention offers an economically feasible and more effective means of continuous production which will overcome the disadvantages of the conventional batch processes.

More particularly, the process according to the present invention comprises feeding humus such as lignite, peat, turf and the like in crushed form into a sealed chamber, injecting 20 to 50% nitric acid into the feed material while in transport toward one end of the chamber and agitating the whole until the desired nitro humic acid is produced. In this instance of the invention, it is to be noted that the entire steps of the process are carried out in a continuous mode of operation without having to heat the chamber from its exterior.

While the above reaction is being carried out, one or more magnesia-containing materials chosen from the group consisting of dolomite, magnesite, magnesia, serpentine, silicic acid magnesium, magnesium hydroxide, and the like, can be added to and reacted with the initial mixture so that nitro humic acid magnesium may be obtained on a continuous basis.

In an effort to achieve a smooth and effective reaction, the present invention contemplates employment of a kneader-type reactor capable of continuous operation. This reactor is equipped with a few or more rotary bladed shafts to agitate a mixture in a fixed ratio of pulverized lignite and nitric acid. The feed mixture introduced into the reactor from one end undergoes the reaction and comes out of the other end of the equipment. Nitrogen gas produced from the reaction may be subjected to oxidation and recovered for re-use. The reactor under consideration is made of stainless steel to prevent oxidation, and it is constructed large enough to anticipate the boiling over or spurting of the liquid mixture. In fact, the reactor used in accordance with the present invention is believed to be the first of its kind ever known for use in the manufacture of nitro humic acid. In other words, nearly all conventional batch-style equipment operations involve widely varied latent periods in the early stage of reaction and sudden occurrence of reaction which follow upon passage of said latent periods with the result that the majority of reaction products are either in a liquid phase or foamy yet slurry state. These difficulties will be successfully eliminated by the use of the kneader-reactor described and schematically illustrated in the accompanying drawings.

It may be mentioned here that nitric acid can be rendered reactive, even if it is of low concentration, by applying sufficient heat, whereas it is well to remember that nitric acid of sufficient concentration or about 20% at the least is internally generative of heat at normal temperature. Nitric acid of lower concentration varies in its latent period before it starts to react but at higher concentrations its latency grows shorter. At about 27% concentration the reaction of nitric acid accurs almost instantaneously. This fact obviates the necessity of heat application. At the same time, the fact that the velocity of reaction of nitric acid is generally greater the higher the concentration suggests that the overall length of the equipment can be reduced accordingly. On the other hand, however, too high a concentration of this acid tends to introduce a loss in the yield of the desired nitro humic acid. Nitric acid when used in 50% or higher concentration causes a rapid decrease in the net yield of the product. It follows from the above discussion that the optimum concentration of nitric acid in the instance of the present invention is substantially between 20% as a lower limit and 50% as an upper limit.

The principal advantages of the present invention in addition to the continuous reaction procedures made possible to the exothermic heat generation and maintenance of nitric acid as above noted are listed as follows:

(a) No external heat application is required.
(b) No critically strict reaction control is needed.
(c) Short reaction time.
(d) Reaction products contain a reatively small amount of water.
(e) Lignite or like humic substance as starting materials may be used rather coarse.
(f) Low power for agitation in the reactor.
(g) Low initial costs.

Attention is now invited to the method for continuously neutralizing nitro humic acid. Conventional processes of neutralization employ the ionic reaction under liquid-phase conditions. To achieve continuous operation on such processes tremendous cost is entailed for equipment and facilities. In view of this, the present inventors conducted extensive research and tests over a period of time in an effort to find and ascertain the possibility of a liquid-phase as well as a solid-phase reaction for neutralization of the acids.

For neutralization of nitro humic acid in accordance with the present invention, magnesia-containing materials repeated hereinabove, which include magnesite, magnesia, dolomite, serpentine, silicic acid magnesium, magnesium hydroxide and the like, are used to produce magnesium salts in a continuous mode of operation. Taking serpentine as an example, its moisture content and temperature govern the rate of reaction and when these factors are properly predetermined sufficient reaction can take place with good results. The amount of magnesium-containing material to be used may vary with the conditions in which nitro humic acid is produced, but it is believed that MgO can theoretically react in about 6 to 7.5% with nitro humic acid.

Experiments indicate that in order to retain more than 80% of nitro humic acid in the product according to the present invention, it is necessary to maintain the said product at 60° C. or above in the presence of 30% or more of water for 30 minutes, or at 40° C. in the presence of 40% or more of water for 30 minutes. These requirements may be easily met when the reaction product from the continuously operating reactor is immediately admixed with a magnesium-containing material, without having to rely upon external heating sources. Unlike the conventional batch operations employing neutralization after the product is filtered and washed, the product obtained by the present invention is subjected as a whole to neutralization without filtering nitro humic acid from the waste liquor. Consequently, there may be retained some lower oxide matters and nitric acid in the end product. These foreign contents, however, have been ascertained to be free from adversely affecting the plants and vegetables under culture, and, in fact, some lower organic acids helps maintaining the soil to be granular and aerative and can be advantageously retained in the end product of the invention.

The present invention having been described as to its typical processes for producing a solid conditioning improving compound, will now be described in connection with an apparatus employed for the said processes. The description follows with reference to the accompanying drawings, in which:

FIG. 1 is a longitudinal cross-sectional side view of the reactor system employed to implement the present invention, FIG. 2 is a transverse cross-sectional view taken on the line II—II of FIG. 1, FIG. 3 graphically displays the rate of reaction of nitro humic acid with magnesite plotted against time under given temperature conditions, and FIG. 4 graphically shows the variations of reactivity of calcined and non-calcined serpentines with nitro humic acid as plotted against time under given temperature conditions.

Referring first to the illustrations of FIGS. 1 and 2, a reactor vessel indicated at 1 is provided with two rotary shafts 2, 2 extending in the direction of its length. The two shafts having a suitable number of blades are arranged to rotate in opposite directions to effect the agitation of the feed mixture in the reactor vessel. The reactor vessel 1 is designed practically sealed as a whole and provided at one end with a feed pipe 4 having rotary valves 3, 3 and at the other end with an outlet pipe 8 having a spiral device 10 therein which is interlinked by a pinion gear arrangement 9 to the drive shaft 2. The vessel 1 is shown as being further provided near the feed pipe 4 with a HNO₃ tube 6 having a funnel 5 disposed within the vessel and at the upper front with a vertical pipe 7 connected to a HNO₃ recovery unit (not shown). The reactor vessel 1 thus constructed receives crushed lignite or the like as feed via the pipe 4 and subsequently nitric acid of about 20 or 50% concentration from the HNO₃ supply tube. These materials are sufficiently agitated by the action of the two oppositely rotating bladed shafts 2, 2 as they move toward the other end of the vessel 1. The reaction occurs progressively as the mixture is advanced in the vessel 1, until the majority of the reaction mixture turns into nitro humic acid which is subsequently taken out via the outlet pipe 8. NO₂ gas produced during the reaction is taken up through the vertical pipe 7 and sent to the recovery section (not shown) to be processed for re-use.

Application examples of the present invention are summarized below with respect to a batch and a continuous type of process, respectively:

*Example 1*

Lignite produced in Yamagata Prefecture (containing 62.33% of volatile portion, 31.22% of fixed carbon, 6.95% of ash and 14.65% of humic acid) was crushed to 60 mesh. To 100 parts of this lignite were added 40 parts of magnesium oxide and 200 parts of water. The whole was sufficiently mixed and agitated and introduced into an autoclave whereby it was heated to 158° C. under 5 kg./cm.² for about 3 hours. As a result, there were obtained 141 parts of humic acid magnesium in dry form. Humic acid content in this product was about 55.69%.

*Example 2*

Peat produced in Iwate Prefecture (containing 43.2% of volatile ingredients, 12.8% of ashes and 28% of fixed carbon) was crushed to 60 mesh, 100 parts of which were added 3 parts of caustic soda, 10 parts of magnesium oxide and 100 parts of water. The whole was sufficiently heated and maintained in a boiling state for 3 hours and thereafter washed with water and filtered to remove slime. The resulting humic acid magnesium registered 111 parts with 67.30% of humic acid content.

In the above exemplified processes the following points should be considered:

(1) Where magnesium hydroxide is used alone, to 100 parts vehicle material (humus) may be added 5% or more parts of magnesium oxide in the presence of water and heated to 150° C. or above and under 5 kilograms of pressure for a period of about 2 hours, in which case, however, magnesium oxide should preferably be in the form of hydroxide of the type which may be obtained by precipitating lime form nitric acid magnesium, and magnesium oxide exposed to calcination is not suitable for use in the present invention.

(2) Where reaction is contemplated with magnesia hydroxide in coexistence with alkali, to 100 parts humic material of crushed form may be added 2.5 parts of alkali and 5 parts of magnesia-containing material. The whole may be heated to a point of boiling in the presence of water under normal pressure for about 1 hour. In this case, an alkali matter may be initially added to the starting composition, being followed by the introduction of hot magnesium hydroxide.

The resulting product obtainable in accordance with the above conditions normally contains about 50% to 70% of humic contents.

The humic acid magnesium obtained according to the present invention was applied 0.10%, 0.20% and 0.30% each to sample soils (volcanic ashy soil and plantation soil), thereby to test its phosphoric acid absorption.

*Phosphoric acid absorption factor*

Nitro humic acid lime:
   0.10% _____ 1996
   0.20% _____ 1805
   0.30% _____ 1775
Invented product:
   0.10% _____ 1986
   0.20% _____ 1777
   0.30% _____ 1757

NOTE: The listed values represent the averages obtained from the tests repeated 3 times.

As can be seen from the above table, humic acid magnesium has a relatively low phosphoric absorption factor compared to ordinary nitro humic acid lime, indicating its superiority as food to the growing plants. Soils in need of conditioning and manuring are generally deficient in magnesia. Such soils demand magnesium rather than lime which has a tendency to suppress the assimilation of magnesia by plants and green vegetables.

*Example 3*

Lignite produced in Iwate Prefecture (containing 12.8% of ashy ingredients, 43.2% of volatile contents and 28.0% of fixed carbon) was crushed to 60 mesh, to 100 parts of which were added 400 parts of 15% nitric acid and heated at 80° C. and maintained in reaction for about 4 hours. The mixture was placed on a centrifugal separator where from about 98.7 parts of dry mass were obtained. This was found to contain 82.1% of nitro humic acid, 3.24% of total nitrogen (dry base) and 35% of water content. The mixture thus prepared was admixed with 19.4 parts of serpentine crushed to 60 mesh and disposed for ageing at 80° C. for 4 hours. The resulting product was 118.0 parts (including dry base and 12.1% of water) which was analyzed to contain:

|   | Percent |
|---|---|
| Nitro humic acid | 68.7 |
| Nitrogen | 27.0 |
| Magnesia | 6.22 |
| Effective magnesia | 3.79 |
| Silicic acid | 11.34 |
| Effective silicic acid | 4.25 |

*Example 4*

Lignite produced in Yamagata Prefecture (containing 6.95% of ashes, 62.33% of volatiles and 31.22% of fixed carbon) was crushed to 60 mesh, to 100 parts of which were added 550 parts of 10% nitric acid and heated at 90° C. and maintained in reaction for 3 hours. The reaction mixture was thereafter filtrated to produce 95.9 parts (dry) of mass containing nitro humic acid. Since nitric acid gas produced during the reaction was recovered and reused, the total net amount of nitric acid consumed would be about 26 parts by percentage relative to 100 parts of lignite. The nitro humic acid containing mass filtrated (containing about 45% of water) was admixed with a 5% solution of 0.5 part caustic soda and further with 28.8 parts of calcined serpentine (41.2% of MgO, 42.5% of $SiO_2$) crushed to 60 mesh. The whole was kneaded and disposed for ageing at 90° C. for about 2 hours. The resulting product registered 124.3 parts (converted for dry contents) and was analyzed to contain the following:

Contents: | Percent
---|---
Nitro humic acid | 65.3
Nitrogen | 1.95
Magnesia | 10.21
Effective magnesia | 6.97
Silicic acid | 16.3
Effective silicic acid | 5.21

Example 5

Lignites produced in Iwate Prefecture (containing 12.8% of ashes, 43.2% of volatiles and 28.0% of fixed carbon) was crushed to 60 mesh, to 100 parts (dry) of which were added 576 parts of 15% nitric acid and heated by reaction heat up to 80° C. under agitation. The whole was so maintained for 3 hours and thereafter classified by means of a centrifugal separator, producing 95.6 parts (dry) of mass containing nitro humic acid. Analysis of this mass showed 82.1% of nitro humic acid, 3.24% (dry base) of total nitrogen and 35.3% of water. 100 parts (dry) of the reaction product were admixed with 100 parts of calcined magnesite (T-MgO 93.45%, C-MgO 79.63%) crushed to 60 mesh and water in an amount corresponding to 70% of the sum (dry) of nitro humic acid-containing material and calcined serpentine. The whole was mixed until it became substantially homogeneous, followed by heating at 90° C. for 4 hours and disposed for ageing. The resulting end product was 109.2 parts (dry) which consists of the following.

Contents: | Percent
---|---
Water | 22.62
Nitro humic acid | 58.18
Total nitrogen | 2.30
Total magnesia | 6.81
MgO dissolved in 2% citric acid | 6.38

Example 6

100 parts of nitro humic acid-containing material of the same composition as illustrated in Example 1 were admixed with 23.8 parts (dry) of 100 mesh serpentine (T-MgO 35.53%, C-MgO 1.38% and S-$SiO_2$ 37.66%) and water in an amount corresponding to 80% of the sum of the above two solid materials. The whole was mixed sufficiently until it became substantially homogeneous and thereafter heated to 110° C. for 3 hours. The resulting product registered 118.7 parts (dry) and contained as follows:

Contents: | Percent
---|---
Water | 19.30
Nitro humic acid | 53.36
Total nitrogen | 2.10
Total magnesia | 5.88
Magnesia dissolved in 2% citric acid | 2.20
Total silicic acid | 6.28
Silicic acid dissolved in ½ chloric acid | 2.66

Example 7

100 parts of nitro humic acid-containing material of the same composition as shown in Example 1 were admixed with 22.8 parts (dry) of 100 mesh calcined serpentine (T-MgO 40.74%, C-MgO 2.94% and T-$SiO_2$ 42.95%) and water in an amount corresponding to 80% of the sum of the above two solid materials. The whole was mixed until it became substantially homogeneous and thereafter subjected to ageing at 110° C. for 3 hours. The resulting product registered 122.3 parts (dry), analysis thereof showed:

Contents: | Percent
---|---
Water | 20.03
Nitro humic acid | 53.68
Total nitrogen | 2.12
Total magnesia | 6.17
Magnesia dissolved in 2% citric acid | 3.56
Total silicic acid | 6.64
Silicic acid dissolved in ½ chloric acid | 3.02

Example 8

Exemplified below is the continuous mode of process carried out in accordance with the present invention using the apparatus illustrated in FIGS. 1 and 2.

Lignite with 26.4% water content crushed to 35 mesh and serpentine crushed to 65 mesh were introduced into the reactor vessel via the feed pipe. Simultaneously, 30% $NHO_3$ was fed at 118.4 kg./hr. into the reactor and blended under agitation with the magnesia-humus feed mixture, during which time the temperature of the reactor vessel was maintained between 80 and 90° C. After about 20 minutes long reaction the reaction product containing 48% water content was taken out at the rate of 155.1 kg./hr. The resulting product by absolute dry conversion was 65.1 kg./hr., which contained 85.2% of nitro humic acid. Spent gas was 12.5 kg./hr., of which nitric acid was recovered for re-use as previously discussed. With this continuous operation, the desired nitro humic acid magnesium was produced at the yield of 100 kg./hr. (water content: 22%) during which time the reaction temperature was 68° C. in the mean.

Now, in an effort to prove that the soil improving compound according to the present invention exists in the form of nitro humic acid magnesium and has an adequate solubility, experiments were conducted in which a sample of the invented product was extracted with 1% sulfate of soda solution. That is, to the nitro humic acid soda solution was added nitric acid magnesium with the result that nitro humic acid magnesium was formed as precipitate.

The nitro humic acid magnesium thus obtained was subjected to extraction using cold water, hot water, Peterman's solution and sulfate of soda, respectively, with the following results:

Extraction with:
  (a) Cold water, 50 to 60% of theoretical value
  (b) Hot water, 70 to 80% of theoretical value
  (c) Peterman's solution, 100% of theoretical value
  (d) Sulfate of soda (1%), 100% of theoretical value Subsequently, another experiment was made to extract magnesium contained in water-insoluble magnesium salts such as $MgCO_3$, $Mg(OH)_2$, serpentine, dolomite and the like. In this instance, Peterman's solution and sulfate of soda solution were employed with the result that considerable unreacted Mg was extracted with the former solution while no unreacted Mg was given with the latter solution. This suggests that the formation of nitro humic acid magnesium which is the object of the present invention can be fully ascertained by the use of sulfate of soda solution. The same can be said of the case where nitro humic acid is reacted with serpentine and other magnesium-containing matters.

Presently known as salts of nitro humic acid are ammonium, sodium, calcium and urea. However, the soil improving compound of the present invention characteristically differs from these known products as has been discussed herein above.

While the foregoing description of the present invention has been given in detail of some of the specific embodiments of the invention to illustrate the application of the inventive principles, it will be understood to those skilled in the art that the invention may be embodied otherwise without departing from such principles.

What is claimed is:

1. The process of producing a soil nutrient comprising reacting a humic matter selected from the group consisting of lignite, peat, turf and mixtures thereof with nitric acid of 20-50% strength to thereby obtain a nitro humic acid, admixing said nitro humic acid with a magnesia-containing matter selected from the group consisting of magnesium carbonate, magnesium hydroxide, magnesium oxide, serpentine, calcined serpentine and dolomite in a ratio sufficient to retain a total magnesium content in excess of 4% in the resultant product, and maintaining the mixture at 20°-120° C. in the presence of water in a quantity exceeding 50% by weight of the mixture whereby the magnesia-containing matter and nitro humic acid react with one another to produce the desired soil nutrient and recovering the resulting soil nutrient.

2. The process of producing a soil nutrient comprising subjecting a humic matter selected from the group consisting of lignite, peat, turf and mixtures thereof to nitratiton with nitric acid of 20% to 50% strength to thereby obtain a nitro humic acid; and thereafter reacting at 20°-120° C. in liquid phase 100 parts by weight of said nitrated humic matter with 10-40 parts by weight of calcined serpentine in the presence of water in a quantity exceeding 50% by weight of the reaction mixture and recovering the resulting soil nutrient.

3. The process of producing a soil nutrient comprising reacting a humic matter selected from the group consisting of lignite, peat, turf and mixtures thereof with nitric acid of 20-50% strength in a hermetically sealed atmosphere, the ratio of said nitric acid to said humic matter being between 0.3 to 1 and 0.7 to 1, and thereafter reacting the mixture under strong agitation with at least one kind of a magnesia-containing matter selected from the group consisting of magnesium carbonate, magnesium hydroxide, magnesium oxide, serpentine, calcined serpentine and dolomite, the ratio of addition of said magnesia-containing matter being such which will retain a total magnesium content in excess of 4% in the resultant product and recovering the resulting soil nutrient.

References Cited by the Examiner

UNITED STATES PATENTS

| | | | |
|---|---|---|---|
| 838,108 | 12/06 | Hammerschlag | 71—24 |
| 1,606,015 | 11/26 | Blackwell | 71—23 |
| 2,093,047 | 9/37 | Hudig et al. | 71—24 |
| 2,129,334 | 9/38 | Northen | 71—24 |
| 2,916,853 | 12/59 | Latoyrette et al. | 71—23 |
| 2,992,093 | 7/61 | Burdick | 71—24 |
| 3,114,625 | 12/63 | Higuchi et al. | 71—24 |

FOREIGN PATENTS 6,405    1896    Great Britain.

DONALL H. SYLVESTER, *Primary Examiner.*
ANTHONY SCIAMANNA, *Examiner.*